Figure 1:
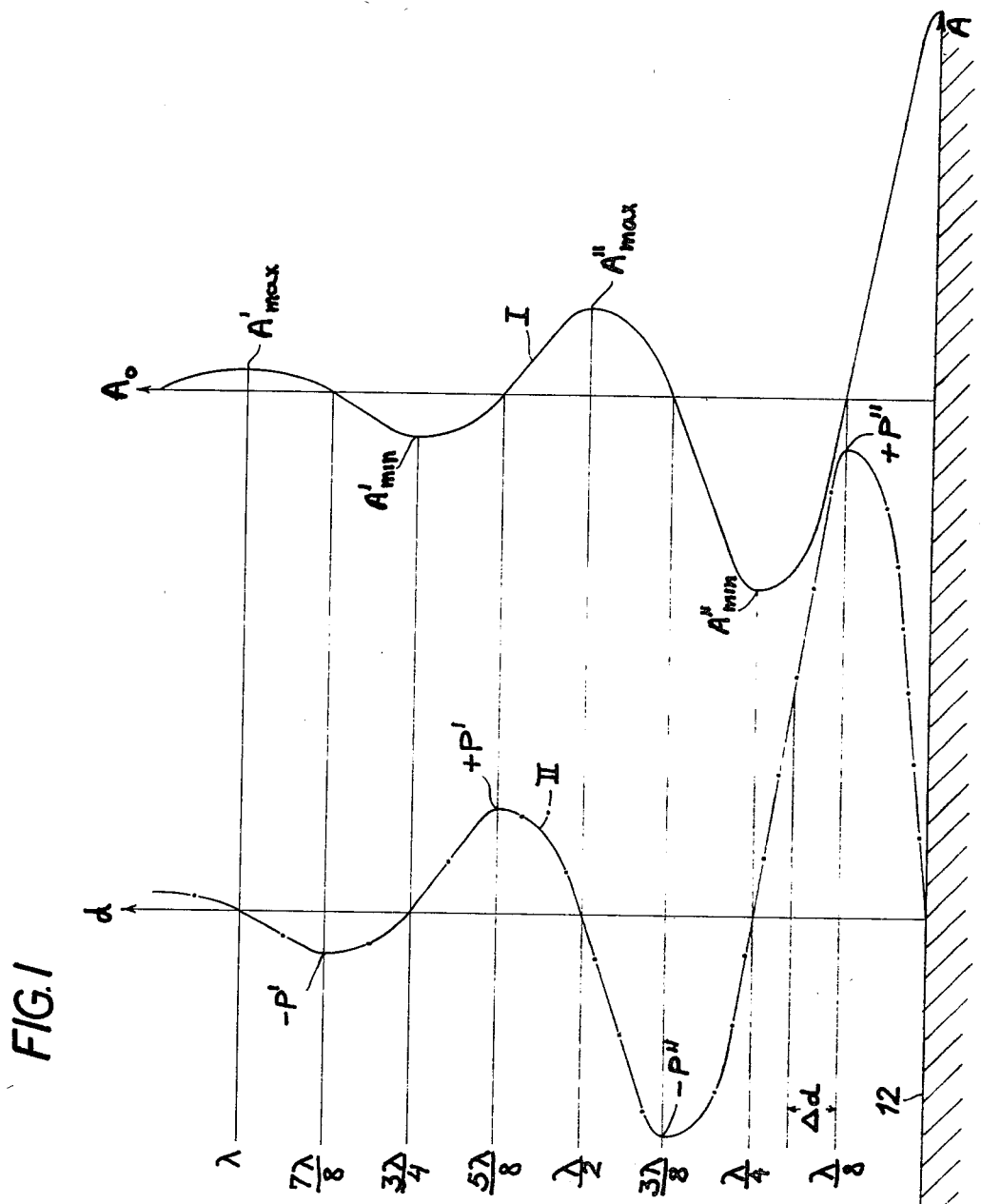

United States Patent [11] 3,594,791

| [72] | Inventor | Robert H. Pintell |
| | | Congers, N.Y. |
| [21] | Appl. No. | 724,467 |
| [22] | Filed | Apr. 26, 1968 |
| [45] | Patented | July 20, 1971 |
| [73] | Assignee | Intron International Inc. |
| | | Congers, N.Y. |

[54] RADIATION-OPERATED DISTANCE METER
3 Claims, 4 Drawing Figs.
[52] U.S. Cl. ................................................ 343/7, 343/12, 102/70.2
[51] Int. Cl. ....................................................... G01s 9/04, F42c 13/04
[50] Field of Search ............................................ 343/7 PF, 12, 13.1, 14; 324/98, 99

[56] References Cited
UNITED STATES PATENTS

| 1,982,271 | 11/1934 | Turner, Jr. | 343/12 |
| 2,151,323 | 3/1939 | Hollmann | 343/12 |
| 2,530,905 | 11/1950 | Ortusi et al. | 343/12 |
| 2,856,852 | 10/1958 | Hinman, Jr et al. | 343/7 |
| 2,882,522 | 4/1959 | Pearlman | 324/98 |

Primary Examiner—Richard A. Farley
Assistant Examiner—T. H. Tubbesing
Attorney—Karl F. Ross ABSTRACT: A vehicle carrying a transmitter of high frequency waves is equipped with means for measuring the current flow in its transmit-receive antenna; in the vicinity of a reflecting object, at distances from the transmitter related in a predetermined manner to the operating wavelength, the antenna current or its derivative reaches a series of peaks whose amplitude increases with diminishing distance. If the operating frequency is varied, distance (e.g. from ground) may be determined as a function of the wavelength at the tallest peak observed with decreasing frequency; a constant operating frequency may be used for actuating a load (e.g. a detonator) upon the vehicle approaching within a predetermined distance of an object as determined by current or voltage measurements.

INVENTOR:
Robert H. Pintell
BY
Karl F. Ross
ATTORNEY

Robert H. Pintell
INVENTOR.

BY Karl F. Ross
ATTORNEY

RADIATION-OPERATED DISTANCE METER

My present invention relates to a system for measuring distance in the atmosphere or in outer space, more particularly for measuring the separation between an aircraft, a missile or some other vehicle and an object (including ground or water) having a sufficiently conductive surface to act as an effective reflector of electromagnetic waves. Such systems are useful for the measurement of relative altitudes, for the triggering of detonators, photographic equipment or similar loads upon approaching a target, and for docking maneuvers in orbit; they are, however, also suitable for detecting the approach of a target to a stationary transmitting station within a predetermined range therefrom.

The general object of this invention is to provide a system of this character adapted to measure such distances, especially at close range, with a high degree of accuracy.

This object is realized, pursuant to my present invention, by the utilization of what may be considered the free-space equivalent of the standing-wave phenomenon of reflectively terminated high frequency lines. Thus, if an emitter of electromagnetic radiation approaches a reflecting surface, the reflecting wave energy will combine with the outgoing radiation in a progressively varying phase relationship which is additive at distances equal to a whole number of half-wavelengths from the reflector so that the apparent impedance of the radiation antenna is reduced in these positions and the antenna current reaches a peak. The magnitude of this peak, in turn, increases with decreasing target distances and rapidly approaches a maximum at close range. Though the actual target distance (a term here meant to include elevations above ground level when the system is to be used for altitude measurements) coinciding with a particular current peak depends on the operating frequency, the variation in peak amplitude plotted against distance in terms of wavelength follows a predetermined law and is substantially invariable for any given type of reflector. The slope of the antenna current, measurable as the output voltage of a differentiator, varies in a similar manner if the vehicle approaches the target at a substantially constant speed.

Thus, in accordance with my invention, I provide an evaluation network including means for measuring the current flow or its derivative in a transmit/receive antenna, connected to a source of high frequency oscillations, as a function of the relative phase of outgoing and reflected waves; an output circuit coupled to this network responds to the measured current or voltage variations to indicate target distance and/or to actuate a load as the target comes within range.

From the foregoing description it will be apparent that the operating wavelength of the vehicle-borne transmitter should be on the order of magnitude of the ultimate distance to be measured. When the vehicle moves at a more or less constant distance from the target, as in the case of a craft cruising at a relatively low altitude above ground, it will be convenient to provide means for progressively changing the operating frequency so that current peaks will occur whenever the wavelength $\lambda$ is such that the target distance $d=n\lambda/2$ where $n$ represents an integer but where these peaks assume significant magnitudes only for low values of $n$. The peak amplitude $A_{max}$ is given, in first approximation, by the expression $A_{max}=A_o(1+k/n^2)$ where $A_o$ is the normal current amplitude (in the absence of reflection) whence the standing-wave ratio $R=R_{max}/A_o=1+k/n^2$, $k$ being a fraction representing the reflection factor. Thus, upon the occurrence of a peak at the instant when the operating wavelength assumes a particular value $\lambda$, it is possible to ascertain at least the approximate value of $n$ from the aforestated relationship and thereby determine the actual distance $d=n\lambda/2$.

Conversely, when the vehicle approaches a target or vice versa, the operating frequency may be held fixed and the detector output may be utilized to actuate the load at the instant when the ratio $R$ reaches a predetermined magnitude corresponding to the desired target range.

In the latter case, with the vehicle moving at a constant velocity $v$, the AC component of the detected antenna current goes through zero periodically, i.e. whenever the target distance is an odd multiple of $\lambda/8$. The slope of the current at these zero points progressively increases, as a function of $v$, so that the output voltage of a differentiation circuit receiving this current shows progressively higher peaks of alternately positive and negative polarity. The last peak of this undulating voltage occurs at $d=\lambda/8$; thus, with the aid of a suitable reference potential, a target distance equal to or somewhat greater than that value may be positively ascertained. If the vehicle approaches the target with an accelerating motion (as in the case of a free fall), the increase in peak level is even more marked.

A variety of conventional radiators may be used as combined transmitting and receiving antennas for purposes of the present invention. I have found that a radiating coil with its axis perpendicular to the target surface will be particularly effective; the reflected wave energy intercepted by this coil, when of the proper phase, then acts to reduce the apparent impedance of the coil by setting up a magnetic field counteracting the field generated by the impressed oscillator voltage. The current flow in that coil can be conveniently measured by a pickup coil inductively coupled therewith. Alternatively, a dipole parallel to the target surface may be used, advantageously with a surrounding coil, wire loop or ferrite core as an inductive pick up.

Figure 2:
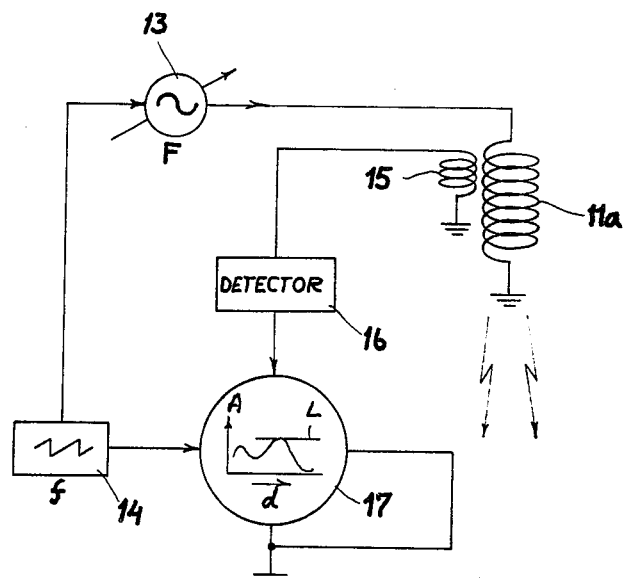
Figure 4:
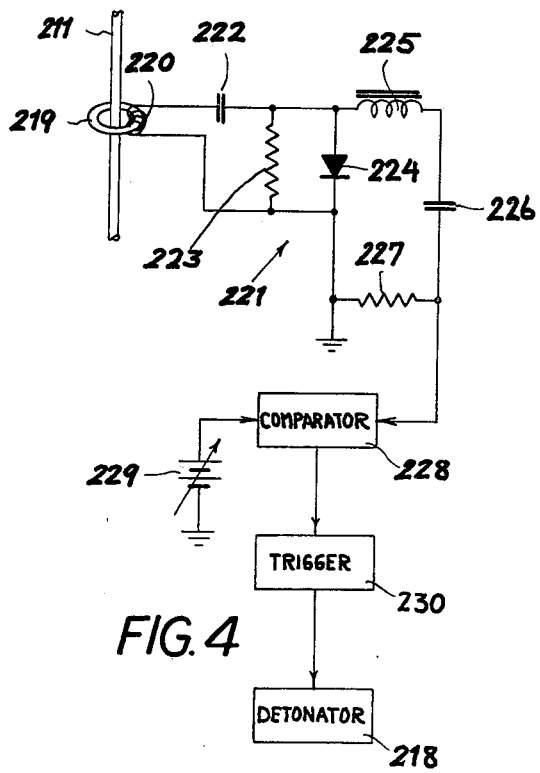
Figure 3:
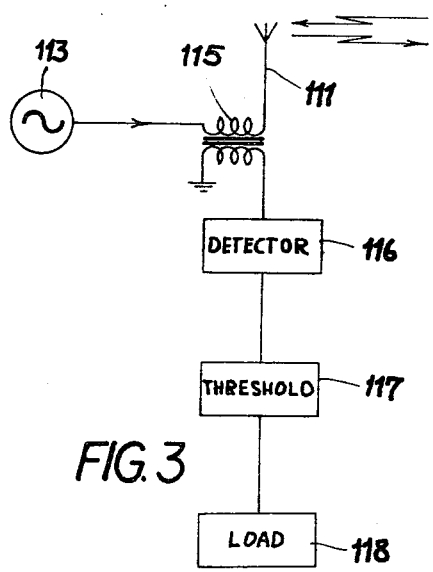

The invention will be described in greater detail with reference to the accompanying drawing in which:

FIG. 1 diagrammatically illustrates an airborne vehicle equipped with a system according to the invention used as an altimeter;

FIG. 2 shows details of a modified version of the altimetric system of FIG. 1;

FIG. 3 diagrammatically illustrates another distance-measuring system according to the invention; and FIG. 4 illustrates details of a modification of the system of FIG. 3.

In FIG. 1 I have illustrated an airborne vehicle 10 equipped with an antenna system, here shown as a horizontal dipole 11, adapted to transmit electromagnetic waves toward the ground 12 and to receive reflections of these waves therefrom. Graph I on the right illustrates the amplitude of the currents circulating in the dipole 11 as measured at various distances $d$ above ground, the elevation being given in terms of wavelength $\lambda$ while the current amplitude A is shown with reference to the normal amplitude $A_o$ measured in the absence of a reflecting surface. The amplitude A reaches a peak $A'_{max}$ at an elevation $d=\lambda$, a trough $A'_{min}$ at an elevation $d=3\lambda/4$, a larger peak $A''_{max}$ at $d=\lambda/2$ and a deeper trough $A''_{min}$ at $d=\lambda/4$. Even though the operating wavelength $\lambda$ may be varied, the standing-wave ratio will have approximately the same value $R'=A'_{max}/A_o$ whenever $d=\lambda$ (or $R''=A''_{max}/A_o$ whenever $d=\lambda/2$) so that the altitude can be measured by progressively varying the operating frequency and determining the point at which R substantially equals the desired value of, say, $R'$ as predetermined in accordance with the reflection factor $k$ of the overflown terrain. In the immediate vicinity of the reflector 12, amplitude A soars above the magnitude of the last peak $A''_{max}$.

Graph II of FIG. 1 shows the derivative of the curve I which would come into existence if the craft 10 approached the ground 12 at a substantially constant velocity, e.g. if it kept on a horizontal course above steadily rising terrain. Curve II exhibits negative peaks $-P'$, $-P''$ at $d=7\lambda/8$ and $d=3\lambda/8$, respectively, as well as positive peaks $=P'$, $=P''$, at $d=3\lambda/8$ and $d=\lambda/8$, respectively. The final peak $+P''$, or some part of its rising flank, may thus be used to determine a target distance within a range $\Delta d$, starting at a point where the value of curve II exceeds for the first time the absolute magnitude of the immediately preceding peak $-P''$ or, if only positive voltages are considered, that of the last-preceding positive peak $+P'$.

A system for displaying the graph I of FIG. 1 has been illustrated in FIG. 2 where a variable oscillator 13 is under the control of a sawtooth generator 14, the latter having a repetition frequency $f$ which is small compared to the range of operating frequencies F of the oscillator. A radiating coil 11a replaces, in the system of FIG. 2, the dipole 11 of FIG. 1 and has a vertical axis for maximum effectiveness in transmitting toward ground and receiving echoes therefrom. Coil 11a is energized by the output of oscillator 13 and is inductively coupled to a small pickup winding 15 which works into a detector 16. The outputs of sawtooth generator 14 and detector 16 are also applied to respective deflecting elements of an oscilloscope 17 whose screen thus displays a trace of the current amplitude A as a function of wavelength $\lambda = 1/F$. With the screen suitably calibrated in units of distance such as meters or feet, the operator can determine the instantaneous elevation by reading the value of $d$ corresponding to that peak which reaches the predetermined level L. Thus, if L is chosen to represent the ratio $R'$ discussed in connection with FIG. 1, consistent with a value $n = 2$ in the aforestated distance formula, the frequency range of oscillator 13 may be so chosen that the wavelength corresponding to the lowest frequency is only slightly greater than the minimum safe altitude to be maintained by the vehicle 10. Lower frequencies will be required if the craft is to fly at an altitude corresponding to approximately half the longest operating wavelength with $R = R''$ and $n = 1$.

Naturally, the oscilloscope 17 is representative of a variety of monitoring devices, including computers for automatically performing the task of measuring altitude in the aforedescribed manner and controlling the pitch of the craft to maintain a predetermined ground distance.

In FIG. 3 I have illustrated a modified system with a fixed oscillator 113 whose output is applied to an antenna 111 in series with a transformer 115 connected to a detector 116. The latter works into a threshold device 117 which, upon ascertaining a peak amplitude equaling or exceeding a predetermined level, actuates a load 118. In this instance, the antenna is oriented to transmit and receive radiation in the general direction of flight; if the coil 11a of FIG. 2 were used, its axis would point in that direction.

FIG. 4 shows part of a dipole 211 enveloped by a toroidal ferrite core 219 provided with a pickup winding 220 which feeds an evaluation network 221 including a detector stage for the high frequency currents of winding 220 and a differentiation circuit for deriving therefrom an output voltage as shown by graph II of FIG. 1. The detector stage comprises a condenser 222, a resistor 223 shunted by a rectifier 224, and a high frequency choke 225. The differentiation circuit comprises another capacitor 226 and a resistor 227. If, as here assumed only the region in the vicinity of peak "P" is of interest, alternate (here negative) half-cycles of undulating voltage II may be suppressed in the output of network 221; this increases the sensitivity of the system and also enables an extension of range $\Delta d$ since the next-highest peak $+P'$ is considerably smaller than peak $+P''$. Thus, a comparator 228 responsive only to positive voltages, and hence effectively acting as half-wave rectifier, also receives a fixed but preferably adjustable reference potential of like polarity from a source 229. As soon as the output voltage of network 221 begins to exceed the reference voltage from source 229, a trigger circuit 230 is actuated to operate a load here indicated as a detonator 218 of a proximity fuse. Elements 228—230 may be considered as the equivalent of threshold device 117 of FIG. 3.

Thus, the distance meter herein disclosed responds to peak or near-peak voltages or currents, the current peaks coinciding with voltage zeros and vice versa. It is also possible to utilize the troughs $A'_{min}$, $A''_{min}$ or the negative peaks $-P'$, $-p''$ of FIG. 1, or to operate on the final rinse of current curve I in the region below $d = \lambda/8$.

I claim:

1. A system for measuring distance between a vehicle having antenna means for emitting and receiving high frequency radio waves and an object reflecting such radio waves, comprising:

a source of high frequency radio waves aboard said vehicle connected to said antenna means;

detector means including a differentiation circuit connected to said antenna means for receiving therefrom combined energy of outgoing waves generated by said source and incoming waves reflected by said object, said detector means delivering an undulating output voltage having peaks progressively decreasing with increasing distance from said object as a function of the wavelength $\lambda$ of said waves;

reference means generating a threshold potential of a magnitude corresponding to that expected to be reached by said output voltage at a distance less than $\lambda/4$ but greater than $\lambda/8$ from said object;

comparison means connected to both said detector means and said reference means for ascertaining a match between said output voltage and said threshold potential;

and trigger means controlled by said comparison means for generating a signal in response to such match.

2. A system as defined in claim 1 wherein said antenna means is a dipole surrounded by a ferrite core inductively coupled to said detector means.

3. A system as defined in claim 1 wherein said detector means further comprises circuitry for suppressing alternate half-cycles of said undulating voltage.